(12) United States Patent
Eidson et al.

(10) Patent No.: US 6,256,477 B1
(45) Date of Patent: Jul. 3, 2001

(54) AVOIDING INTERFERENCE FROM A POTENTIALLY INTERFERING TRANSMITTER IN A WIRELESS COMMUNICATION SYSTEM

(75) Inventors: Donald B. Eidson, San Diego; William R. Flores, San Marcos, both of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/163,972

(22) Filed: Sep. 30, 1998

(51) Int. Cl.$^7$ .................... H04B 15/00; H04B 17/00; H04B 1/10

(52) U.S. Cl. .................... 455/63; 455/67.3; 455/296; 455/67.4; 455/67.1

(58) Field of Search .................... 455/296, 423, 455/67.1, 67.3, 63, 62, 509, 513

(56) References Cited

U.S. PATENT DOCUMENTS

| | | | |
|---|---|---|---|
| 5,148,548 | * | 9/1992 | Meche et al. .................... 455/296 |
| 5,551,064 | * | 8/1996 | Nobbe et al. .................... 455/62 |
| 5,649,303 | * | 7/1997 | Hess et al. .................... 455/67.3 |
| 5,809,401 | * | 9/1998 | Meidan et al. .................... 455/63 |
| 5,862,451 | * | 1/1999 | Grau et al. .................... 455/67.1 |
| 5,884,145 | * | 3/1999 | Haartsen .................... 455/63 |

* cited by examiner

*Primary Examiner*—Thanh Cong Le
*Assistant Examiner*—Meless Zewdu
(74) *Attorney, Agent, or Firm*—Christopher J. Rourk; Akin, Gump, Strauss, Hauer & Feld, L.L.P.

(57) ABSTRACT

A wireless receiver is capable of detecting and avoiding interference from a potentially interfering transmitter. The receiver includes circuitry that determines whether a signal from the potentially interfering transmitter is likely to overlap an expected signal at an assigned carrier frequency or channel. If so, the receiver switches to another carrier frequency or channel to receive the expected signal. In some embodiments, the receiver switches to the other carrier frequency only if the interference is likely to exceed a predetermined threshold.

19 Claims, 9 Drawing Sheets

AVOIDING INTERFERENCE FROM A POTENTIALLY INTERFERING TRANSMITTER IN A WIRELESS COMMUNICATION SYSTEM

TECHNICAL FIELD

The invention relates to wireless communication and, more particularly, to avoiding interference from a potentially interfering transmitter in a wireless communication system.

BACKGROUND

Wireless communication systems allow remote and often portable transceiving devices, e.g., radio telephones ("mobile units"), to communicate bi-directionally with each other and with stationary transceiving devices, e.g., cellular stations ("fixed stations") over great distances. FIG. 1 shows a typical wireless network 10, in which several mobile units 12, 14, 16 communicate with two fixed stations 18, 20. The fixed stations 18, 20 communicate with each other, e.g., via radio frequency (RF) signals 22 or via a public switching telephone network 24 (PSTN).

Many wireless networks, including cellular networks such as the Personal Handyphone System (PHS) networks in Japan and the Digital European Cordless Telephone (DECT) networks in Europe, utilize dynamic channel assignment, through which fixed stations with overlapping coverage areas use and reuse preassigned carrier frequencies. In some systems, such as PHS, the mobile and fixed units employ time division multiple access (TDMA) and/or time division duplex (TDD) communication, which allows each fixed station to communicate with multiple mobile units in a given transmit/receive time period. Each transmit/receive period may include several discrete time slots, each dedicated to transmitting information between a fixed station and a particular mobile unit. A transceiver unit may be assigned to transmit at any given carrier frequency during each time slot, but tends to remain assigned to that slot for a relatively long period of time.

The fixed stations in many TDMA/TDD-based networks, including PHS networks, may be either public or private. In general, a public fixed station may be accessed by any mobile unit within its range, and a private fixed station may be accessed only by phones registered to it. While public fixed stations typically operate under the control of synchronized internal clocks, the clocks among private fixed stations are not synchronized in practice. Moreover, the clocks in private PHS fixed stations must be accurate only to 5 ppm, so over time the clocks in private fixed stations tend to drift with respect to one another. Because a virtually limitless number of PHS mobile units and fixed stations may exist within a given geographic area, and because PHS networks use Dynamic Channel Assignment, private fixed stations are subject to great variations in the interference they experience from other fixed stations. For example, a carrier frequency that presents relatively little interference when first selected by a fixed station may become too noisy for adequate communication when another fixed station suddenly switches to the carrier or as the transmit/receive periods of the fixed stations gradually drift onto each other.

SUMMARY

The invention, in one aspect, allows a wireless receiver to avoid interference from a potentially interfering transmitter. The receiver first determines whether a signal from the transmitter is likely to overlap an expected signal at an assigned carrier frequency or channel. If so, the receiver is allowed to switch to another channel to receive the expected signal.

In some embodiments, the receiver is allowed to switch to the other channel only if the interference is likely to exceed a predetermined threshold. The receiver can determine whether the interference is likely to exceed this threshold, e.g., by measuring the strength of the potentially interfering signal and comparing it to the strength of the expected signal. In a slotted system, e.g., one in which the receiver is scheduled to receive the expected signal within a predefined time or frequency slot, the receiver can determine the strength of the potentially interfering signal, if any, by measuring the received signal strength just outside of the reception slot. Alternatively, if the reception slot is preceded or followed immediately by a blind slot, the receiver can measure the received signal strength just before or just after the blind slot to determine the strength of the potentially interfering signal. The receiver can determine the strength of the expected signal by measuring the received signal strength within the reception slot. The receiver then can determine whether interference is likely to occur by determining the difference between the signal strength measured just outside of the reception slot and the signal strength measured within the reception slot.

In other embodiments, the receiver can use the signal strength measured within the reception slot to update a running average of signal strengths. The receiver then can determine which value is larger: the signal strength measured within the reception slot or the updated average of measured signal strengths. The receiver then can calculate the difference between the larger value and the strength of the potentially interfering signal to determine whether interference is likely to occur.

In another aspect, the invention allows a wireless receiver in a slotted system to avoid interference from a potentially interfering transmitter. The receiver includes a control element, such as an internal clock, that sets the boundaries of a slot within which the receiver is to receive an expected signal. In general, the control element allows the reception slot to drift with respect to similar slots defined by a controller in the potentially interfering transmitter. The receiver measures the received signal strength just outside of the reception slot to determine the strength of the potentially interfering signal, unless the measurement will be preceded or followed immediately by an adjacent slot that is blind with respect to the reception slot. If the adjacent slot is a blind slot, the receiver instead measures the received signal strength just outside of the adjacent slot. The receiver also measures the received signal strength during the reception slot to determine the strength of the expected signal.

The receiver then uses the signal strength measured during the reception slot to update a running average of signal strengths and determines which is the larger value: the signal strength measured during the reception slot or the updated running average. The receiver then determines the difference between the larger value and the signal strength of the potentially interfering signal. If the difference does not exceed a predetermined threshold value, the receiver is allowed to switch to another carrier frequency to receive the expected signal.

In some embodiments, the receiver can employ TDMA. Moreover, the reception slot can be a time slot of given duration.

Each embodiment of the invention may provide one or more of several advantages. A wireless unit need not wait until interference has occurred and has disrupted communication quality to act to avoid the interference. The unit may predict imminent interference from another unit and may switch carrier frequencies or channels before the interfering unit significantly degrades communication quality. Also, the wireless unit rapidly may detect the sudden appearance of threatening interference caused, e.g., when another unit switches to the same carrier frequency. The unit also may measure the power levels of the signal of interest and of the interfering signal independently, which results in a more sensitive mechanism to detect deleterious levels of interference. A wireless communication unit employing the invention is relatively immune to Rayleigh fading, shadowing effects, and false alarms and may be used even in a blind-slot environment.

The details of one or more embodiments of the invention are set forth in the accompanying drawings and the description below. Other features, objects, and advantages of the invention will be apparent from the description, the drawings, and the claims.

DESCRIPTION OF DRAWINGS

Like reference numbers and designations in the various drawings indicate like elements.

DETAILED DESCRIPTION

Figure 1:
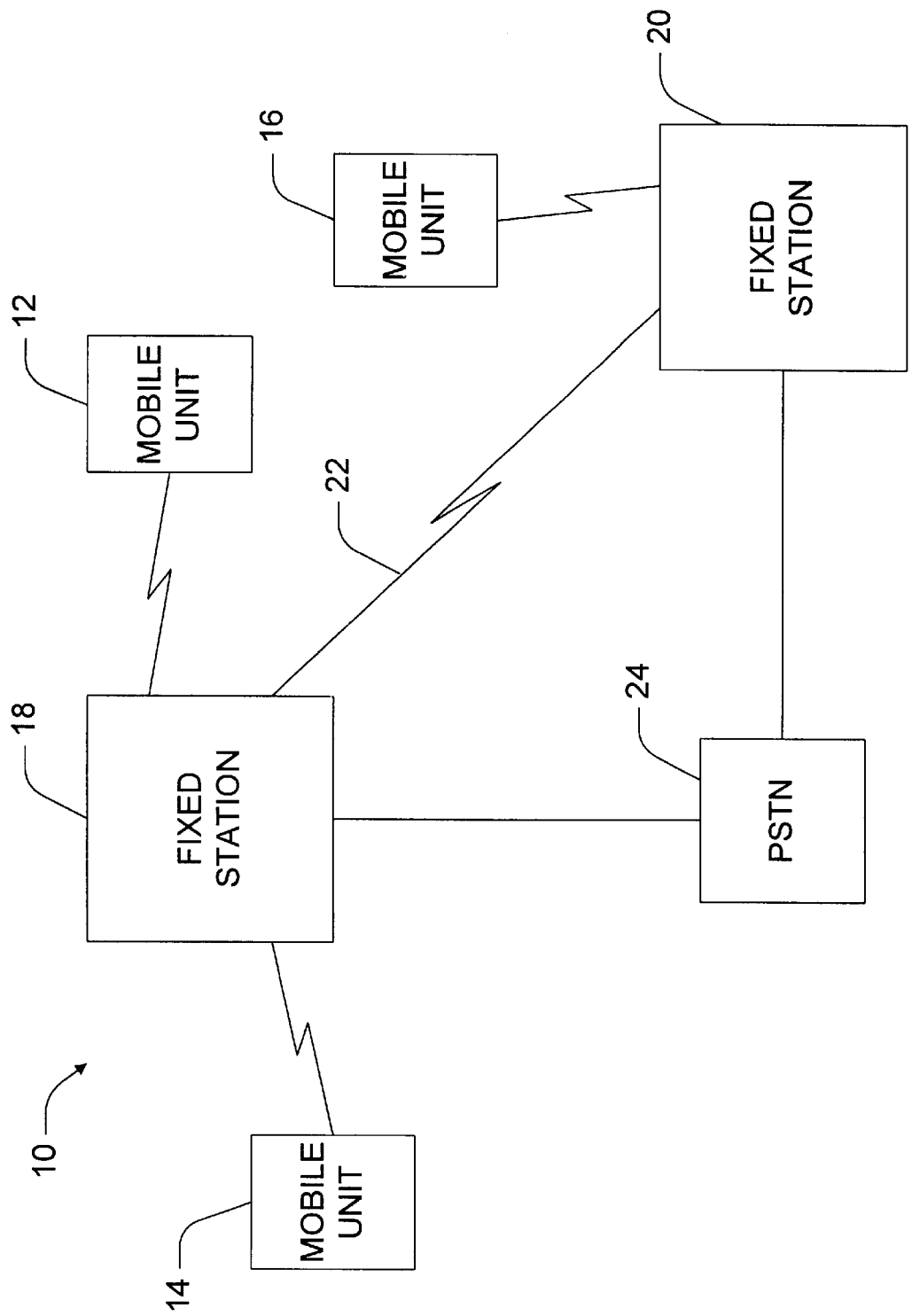
FIG. 1 is a block diagram of a wireless network.
Figure 2:
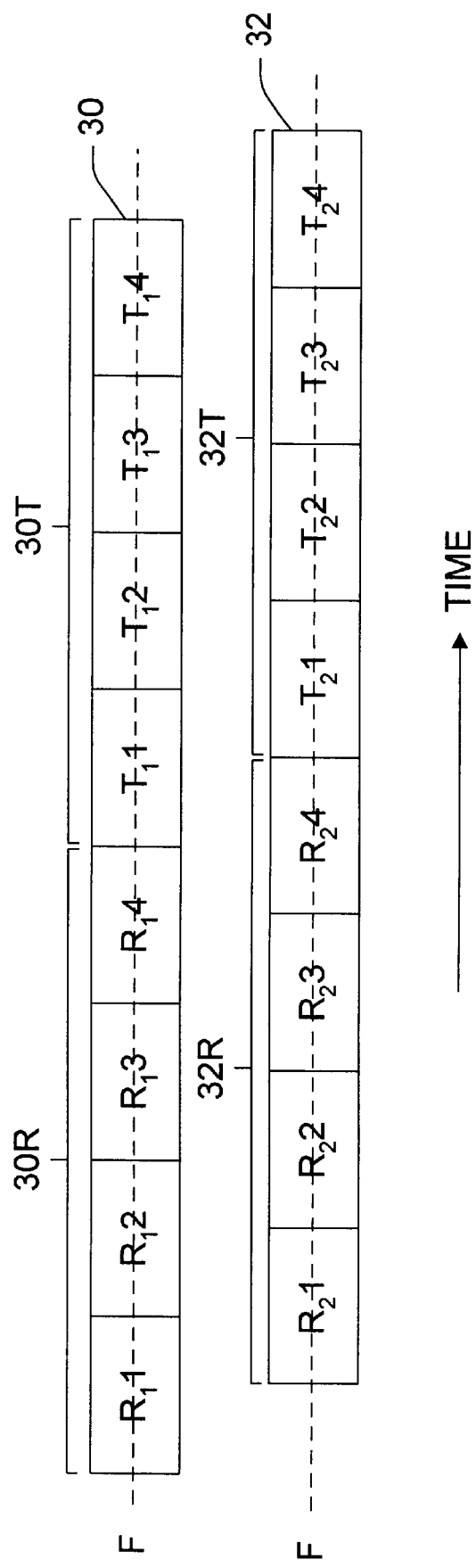
FIG. 2 shows interfering transmit/receive frames for two transmitters on the same carrier frequency in a slotted TDMA/TDD network.

FIG. 2 shows one transmit/receive frame 30, 32 for each of two interfering TDMA/TDD-based fixed stations operating on the same carrier frequency F. Each transmit/receive frame 30, 32 includes eight time slots of equal duration, the first four of which are receive slots 30R, 32R dedicated to receiving information from mobile units, and the last four of which are transmit slots 30T, 32T dedicated to transmitting information to the mobile units. Each fixed station can, and often does, communicate with more than one mobile unit during each transmit/receive frame 30, 32 by assigning each mobile unit at least one time slot in both the receive portion 30R, 32R and the transmit portion 30T, 32T of the transmit/receive frame 30, 32. In general, the receive slot(s) and the transmit slot(s) assigned to any given mobile unit occur at the same position in the receive portion and the transmit portion, respectively, of the transmit/receive frame. For example, a fixed station may communicate with up to four different mobile units during the transmit/receive frame 30 of FIG. 2 by assigning slots $R_1 1$ and $T_1 1$ to the first mobile unit, slots $R_1 2$ and $T_1 2$ to the second mobile unit, slots $R_1 3$ and $T_1 3$ to the third mobile unit, and slots $R_1 4$ and $T_1 4$ to the fourth mobile unit. The fixed station may communicate with fewer than four mobile units during the transmit/receive frame 30 by assigning multiple slots in both the transmit and receive portions to one mobile unit or by leaving slots unassigned. When multiple asynchronous fixed stations communicate on the same carrier frequency F, the transmit/receive frames 30, 32 may overlap to the point that one or more of the fixed stations cannot achieve acceptable signal quality during communication with certain mobile units.

Figure 3:
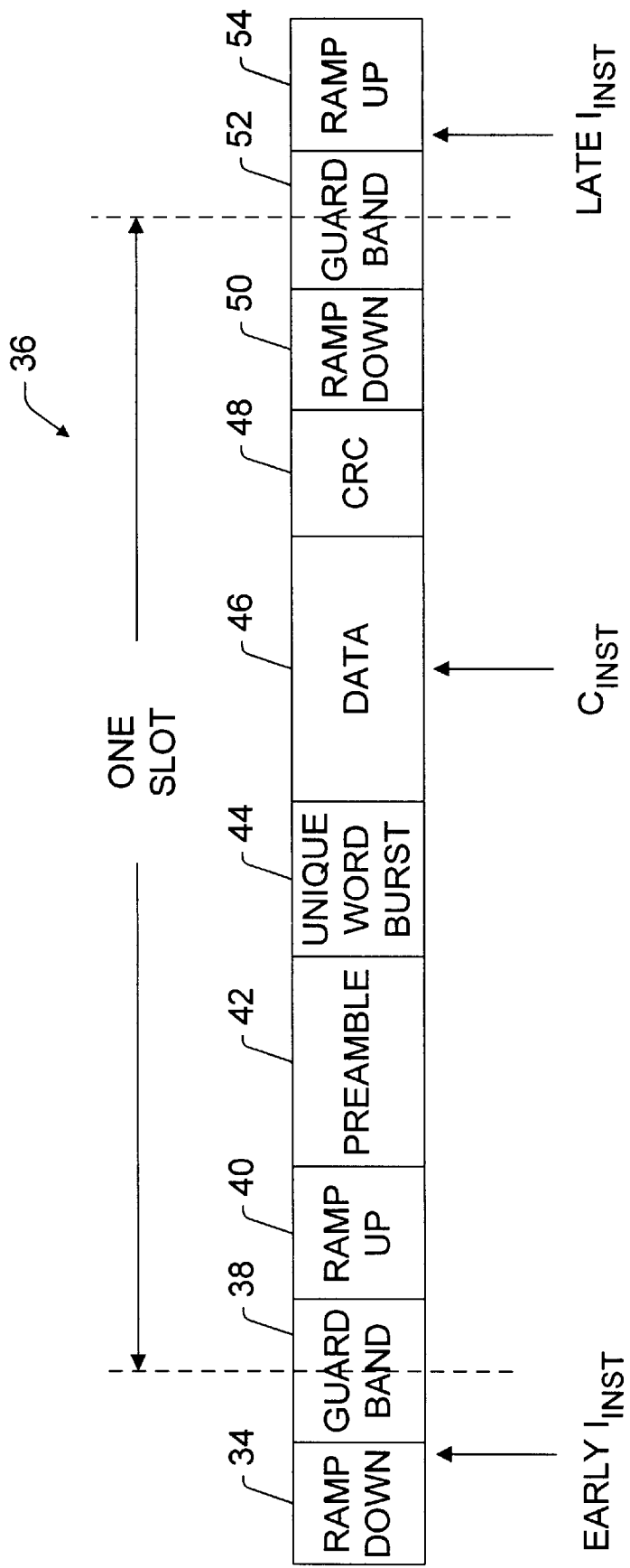
FIG. 3 provides an example of the structure of a TDMA/TDD transmit/receive slot.

FIG. 3 shows the structure of a typical receive slot, which may be of virtually any duration. For example, a slot duration of 625 $\mu s$ may be used in a PHS network. The slot begins with a silent (i.e., idle or quiet) guard band 38 that allows for propagation delays between the fixed station and the mobile unit, if any, associated with the previous slot. The guard band usually spans only a few, e.g., four, transmitted information symbol lengths. The boundary between two slots may lie within the guard band, so that the guard band spans the last few symbols in one slot and the first few symbols in the next slot.

The mobile unit assigned to the time slot 36 then undergoes a ramp up period 40, during which the mobile unit ensures an appropriate power level for communication with the fixed station. The mobile unit then transmits a preamble 42 and a unique word burst 44, which together notify the fixed station that it is to receive the incoming signal and establish synchronization between the fixed station and the mobile unit. The mobile unit then transmits a data packet 46, followed by a cyclic redundancy code (CRC) 48 that allows the fixed station to check for data errors introduced during transmission. The mobile unit terminates the transmission by powering down during a ramp down period 50 and entering another guard band 52.

Figure 4:
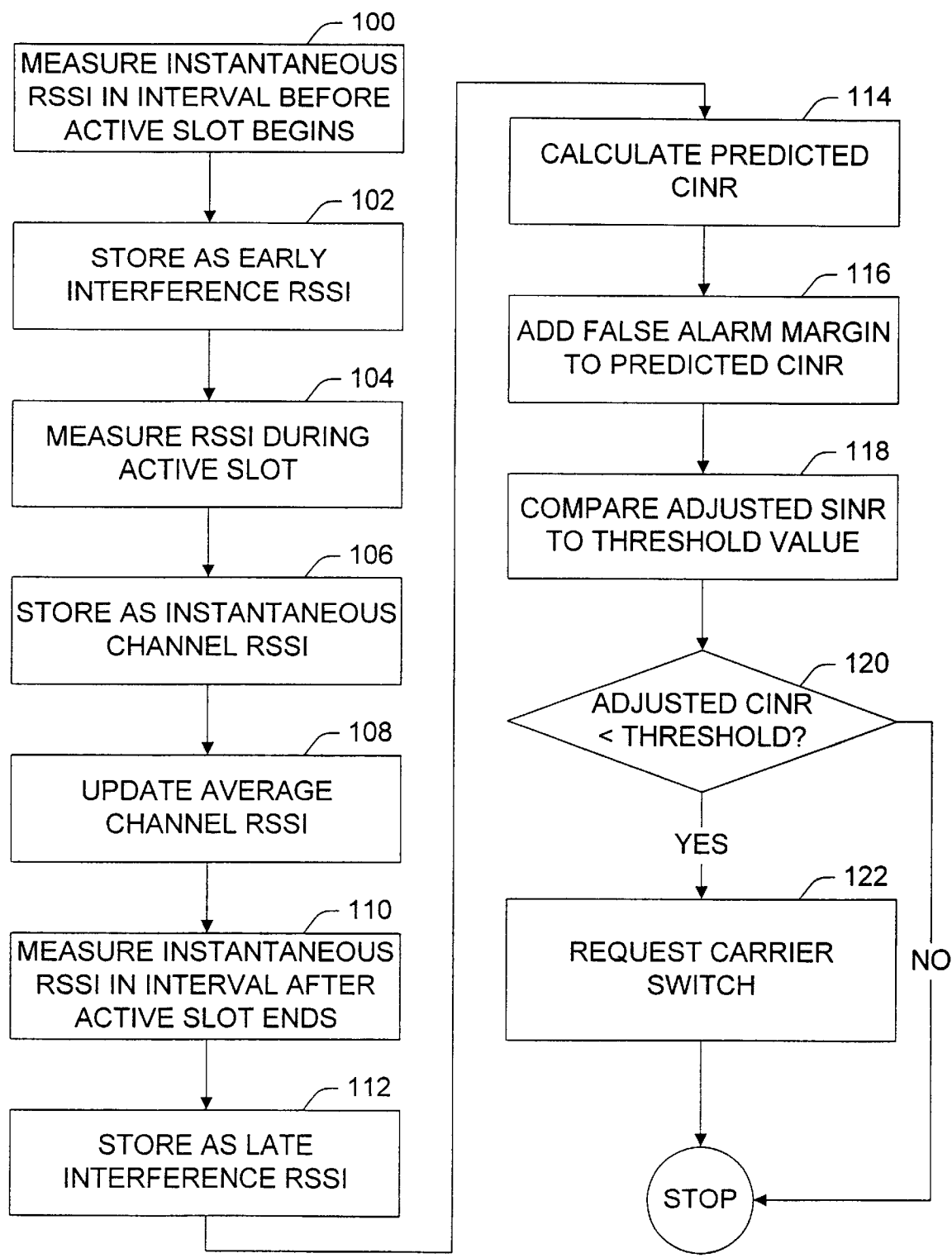
FIG. 4 is a flow chart for a routine by which a transmitting unit may anticipate interference from another transmitting unit.

FIG. 4 shows a routine by which a receiving unit may anticipate and avoid interference with another transmitting unit operating on the same carrier frequency. In general, the receiving unit measures the received signal strength indication (RSSI) on the carrier frequency, both just before entering an active time slot and just after leaving the active slot, to determine the strength of interfering signals. The receiving unit also measures the RSSI during the data burst phase of the active time slot to determine the strength of the signal received from the transmitting unit. The receiving unit uses the measured values to calculate a predicted carrier-to-inference noise ratio (CINR). If the predicted CINR is not sufficiently large, the transmitting unit instructs the transmitting unit, during the next transmission period, to seek to a different frequency. The interfering signal strength is measured at both ends of the active time slot to ensure the discovery of potential interference drifting into the slot from either direction.

The interference anticipation routine begins during the ramp down phase 34 (FIG. 3) of the time slot immediately preceding the active time slot of interest, or during the guard band 38 (FIG. 3), in which the transmitting unit measures the RSSI on the carrier frequency (step 100). To ensure that the measured RSSI value is an accurate indicator of the interference level on the carrier frequency, the transmitting unit may measure RSSI over multiple symbols and perform a mathematical integration. The transmitting unit stores the measured RSSI value as the "early instantaneous" interfering signal strength (early $I_{INST}$) (step 102). The transmitting unit then measures the RSSI within a burst phase of the active slot (step 104) and stores the measured RSSI value as the "instantaneous" carrier signal strength ($C_{INST}$) (step 106). The transmitting unit may measure the RS SI at multiple symbols, consecutive or non-consecutive, during the active slot and then may integrate the measured values mathematically to obtain the instantaneous carrier signal strength. The transmitting unit then uses the instantaneous carrier signal strength to update a running average of the carrier signal strength ($C_{AVG}$), which the transmitting unit maintains over a given number of frames, sometimes exceeding 100 frames (step 108). Averaging the carrier signal strength in this manner removes the effects of signal fade variations during active time slots assigned to the mobile unit of interest.

After the time slot of interest has ended, e.g., during the guard band 52 or the ramp up period 54 (FIG. 3) in the following slot, the transmitting unit again measures the RSSI on the carrier frequency (step 110), this time storing the measured RSSI value as the "late instantaneous" interference signal strength (late $I_{INST}$) (step 112). The transmitting unit then calculates a predicted carrier-to-interference noise ratio ($CINR_{pred}$), according to the following equation (step 114):

$$CINR_{pred} = \max(C_{INST}, C_{AVG}) - \max(\text{early } I_{INST}, \text{late } I_{INST}).$$

In general, a long-term average of the carrier signal strength would suffice in predicting the carrier-to-interference noise ratio, because a long-term average would eliminate fluctuations in signal strength caused by signal fading. However, suddenly appearing interference can be detected more rapidly if an instantaneous or short-term average value is used. Using the larger of the instantaneous and average carrier signal strengths reduces the risk that a false alarm will occur when the received carrier signal strength jumps temporarily, such as when the mobile unit emerges from the shadow of a large obstruction, causing both the active and interfering signals to become more powerful.

After calculating the predicted carrier-to-interference noise ratio, the transmitting unit may add an error, or "false alarm," margin to the predicted ratio to form a CINR switching statistic ($CINR_{stat}$) (step 116). The false alarm margin accommodates measurement uncertainties and fluctuations caused by fading of the interfering signal. Because the probability is very small (approximately 1.8%) that the Rayleigh fading envelope of the interfering signal will be even 6 dB above the average value, and even smaller (approximately 0.0045%) that the interfering signal will exceed the average value by as much as 10 dB, the false alarm margin is relatively small.

The transmitting unit then compares the CINR switching statistic ($CINR_{stat}$) to a stored threshold value (e.g., 15 dB) (step 118) and determines whether the statistic is less than the threshold value (step 120). If so, the transmitting unit requests a switch to another carrier frequency (step 122).

Figure 5:
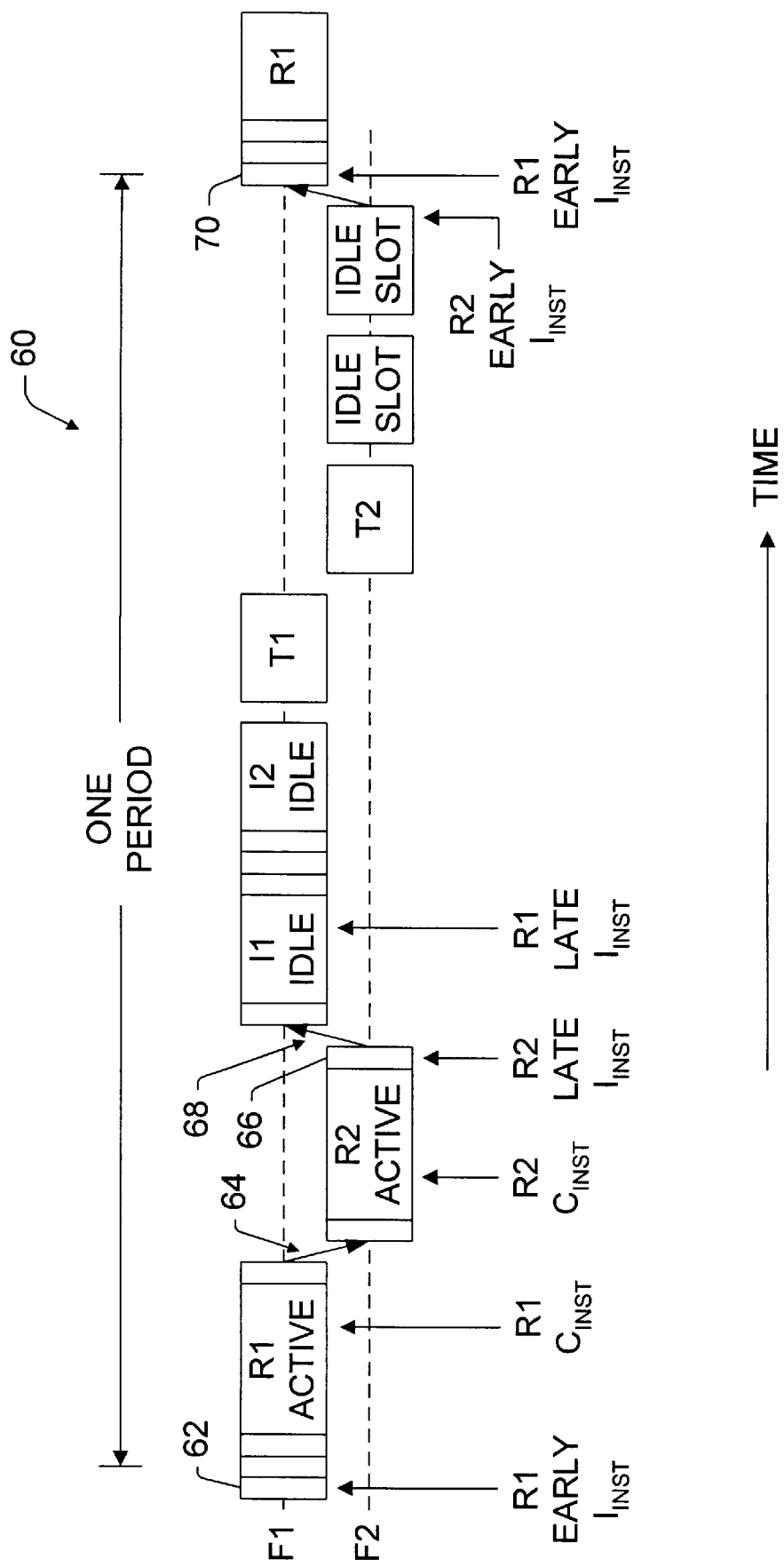
FIGS. 5 and 7 show receive frames for a receiving unit that utilizes two carrier frequencies and has blind slots associated with each carrier frequency.

FIG. 5 provides an example of how a fixed station having a fast-switching frequency synthesizer may communicate over more than one carrier frequency during a single transmit/receive frame 60. The fixed station communicates with at least two mobile units, each of which is assigned a receive slot R1, R2 and, in a TDD system, a transmit slot T1, T2 during the frame 60. Two "idle slots" I1, I2, i.e., slots during which no communication occurs, follow the two receive slots. The fixed station begins the transmit/receive frame 60 by receiving information from the first mobile unit at a first carrier frequency F1 during the first receive slot R1. The station measures the early instantaneous interfering signal strength (R1 early $I_{INST}$) during the ramp down period 62 before the first receive slot R1 and measures the instantaneous carrier signal strength (R1 $C_{INST}$) during the active portion of the first receive slot R1. The fixed station then transitions during the following guard band 64 to a second carrier frequency F2 to receive information from the second mobile unit during the second receive slot R2. Because the fixed station cannot monitor the first carrier F1 during the second receive slot R2, the second receive slot R2 is "unobservable," or "blind." As a result, the fixed station cannot measure the late instantaneous interfering signal strength (R1 late $I_{INST}$) during the second receive slot R2. The fixed station measures the instantaneous carrier signal strength for the second receive slot (R2 $C_{INST}$) during the active portion of this slot and measures the late instantaneous interfering signal strength (R2 late $I_{INST}$) during the ramp down period 66 at the end of this slot.

During the guard period 68 following the second active slot R2, the fixed station transitions back to the first carrier frequency F1 for the first idle slot I1. The station measures the late instantaneous interfering signal strength for the first receive slot R1 (R1 late $I_{INST}$) as soon as possible during the first idle slot I1. The station remains tuned to the first carrier frequency F1 during the first two idle slots I1, I2 and the first transmission slot T1, then transitions to the second carrier frequency for the second transmission period T2. The station remains tuned to the second carrier frequency F2 during the next two idle slots I3, I4 and then transitions to the first carrier frequency F1 before the ramp down period 70 of the fourth idle slot I4 begins. Just before transitioning back to the first carrier frequency F1, the fixed station measures the early instantaneous interfering signal strength for the second receive slot R2 (R2 early $I_{INST}$). As long as the signal strength measurements are taken within only slightly more than one slot of the active slots for which they are taken, these measurements can be used as described above to detect imminent interference.

A fixed station that operates at multiple carrier frequencies in this manner may experience interference from another fixed station at any or all carrier frequencies at which it operates. Interference avoidance is more difficult when the fixed station is hindered by blind slots between active transmit and receive slots.

Figure 6:
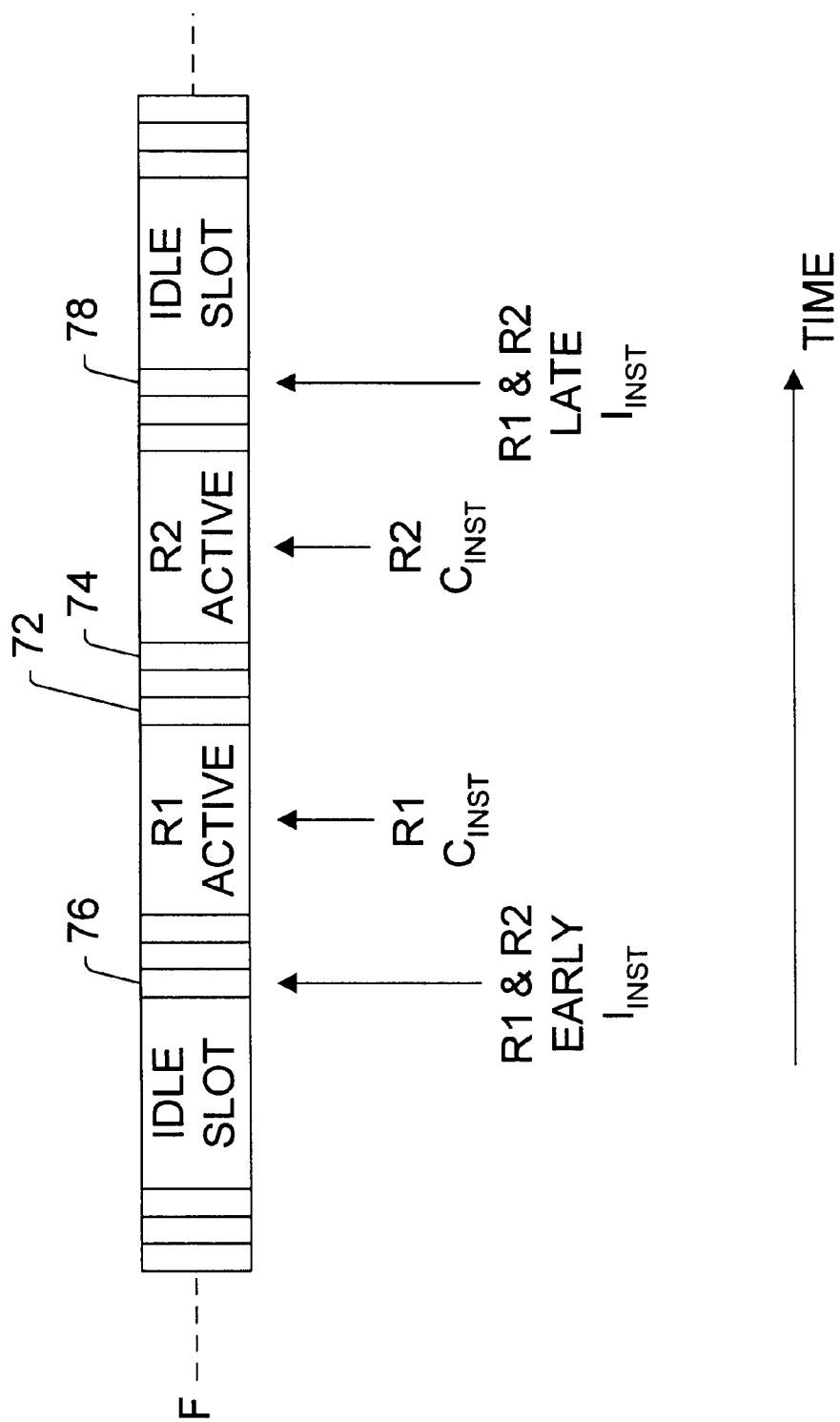
FIG. 6 shows a receive frame for a receiving unit that has blind slots on a single carrier frequency.

FIG. 6 illustrates the measurement of interfering signal strength and carrier signal strength when the fixed station communicates with two different mobile units during consecutive receive slots on the same carrier frequency F ("same-carrier blind slots"). In this example, the receive slots R1, R2 are adjacent to each other, and each is adjacent to an idle slot. Because the fixed station will receive information during each of the active receive slots R1, R2, the ramp-down period 72 and the ramp-up period 74 between the active slots cannot be used to measure interfering signal strength. However, because any interfering signal of interest will occur within approximately one slot duration of an active slot, the early instantaneous interfering signal strength (early $I_{INST}$) and the late instantaneous interfering signal strength (late $I_{INST}$) may be measured for both active slots R1, R2 during the ramping periods immediately preceding and immediately following the active slots. In particular, the fixed station measures early $I_{INST}$ for both receive slots R1, R2 during the ramp-down period 76 before the first receive slot R1 and measures late $I_{INST}$ for both receive slots during the ramp-up period 78 after the second receive slot R2. The fixed station measures the instantaneous received signal strength ($C_{INST}$) for each receive slot during the active portion of the receive slot. The fixed station then uses the measured values as described above to determine whether interference is likely to occur during subsequent receive periods.

Figure 7:
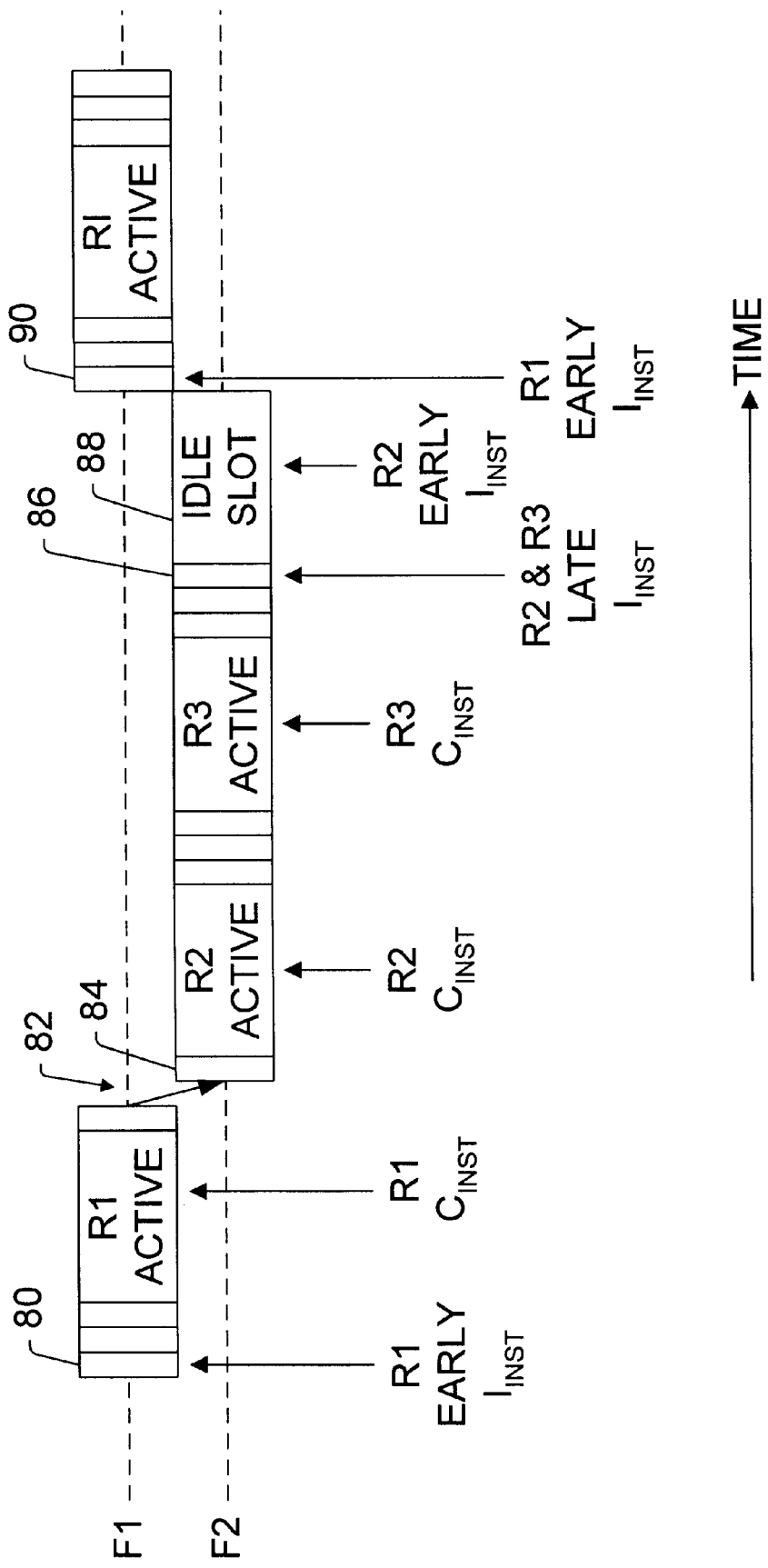

FIG. 7 illustrates another example, in which the fixed station communicates with three different mobile units during three consecutive receive slots R1, R2, R3 on multiple carrier frequencies F1, F2 ("multiple-carrier blind slots"). In this example, the fixed station cannot measure all of the RSSI values (early $I_{INST}$, late $I_{INST}$, and $C_{INST}$) for all three active slots because each of the receive slots is "blind" to the other receive slots. Moreover, the one "idle" slot is "blind" to the first receive slot R1 because the fixed station remains at the second carrier frequency F2 during the idle slot.

The fixed station begins the receive period by receiving information from a mobile unit at the first carrier frequency F1 during the first receive slot R1. The fixed station measures early $I_{INST}$ for the first receive slot RI during the ramp-down period 80 immediately preceding the first receive slot RI. The fixed station then measures $C_{INST}$ for the first receive slot R1 during the active portion of the slot R1. The fixed station switches to the second carrier frequency F2 during the guard band 82 following the first receive slot R1. Because the following ramp-up period 84 occurs after the fixed station has switched to the second carrier frequency, and because the second receive slot R2 is "blind" to the first receive slot R1, the fixed station cannot measure late $I_{INST}$ for the first receive slot.

The fixed station measures $C_{INST}$ for the second and third receive slots R2, R3 during the active portions of those slots. The fixed station then measures late $I_{INST}$ for both the second and third receive slots during the ramp-up period 86 immediately following the third receive slot R3.

At the end of the following "idle" slot 88, the fixed station measures early $I_{INST}$ for the second receive slot R2. The early $I_{INST}$ value measured at the end of the idle slot 88 is valid for the second receive slot R2 because the value is measured only slightly more than one slot duration before the second receive slot R2 for the next receive period. The fixed station then switches rapidly to the first carrier frequency F1 during the ramp-down period 90 that follows the idle slot 88, so that the fixed station can measure early $I_{INST}$ for the first receive slot R1 before the ramp-down period 90 ends.

Figure 8A:
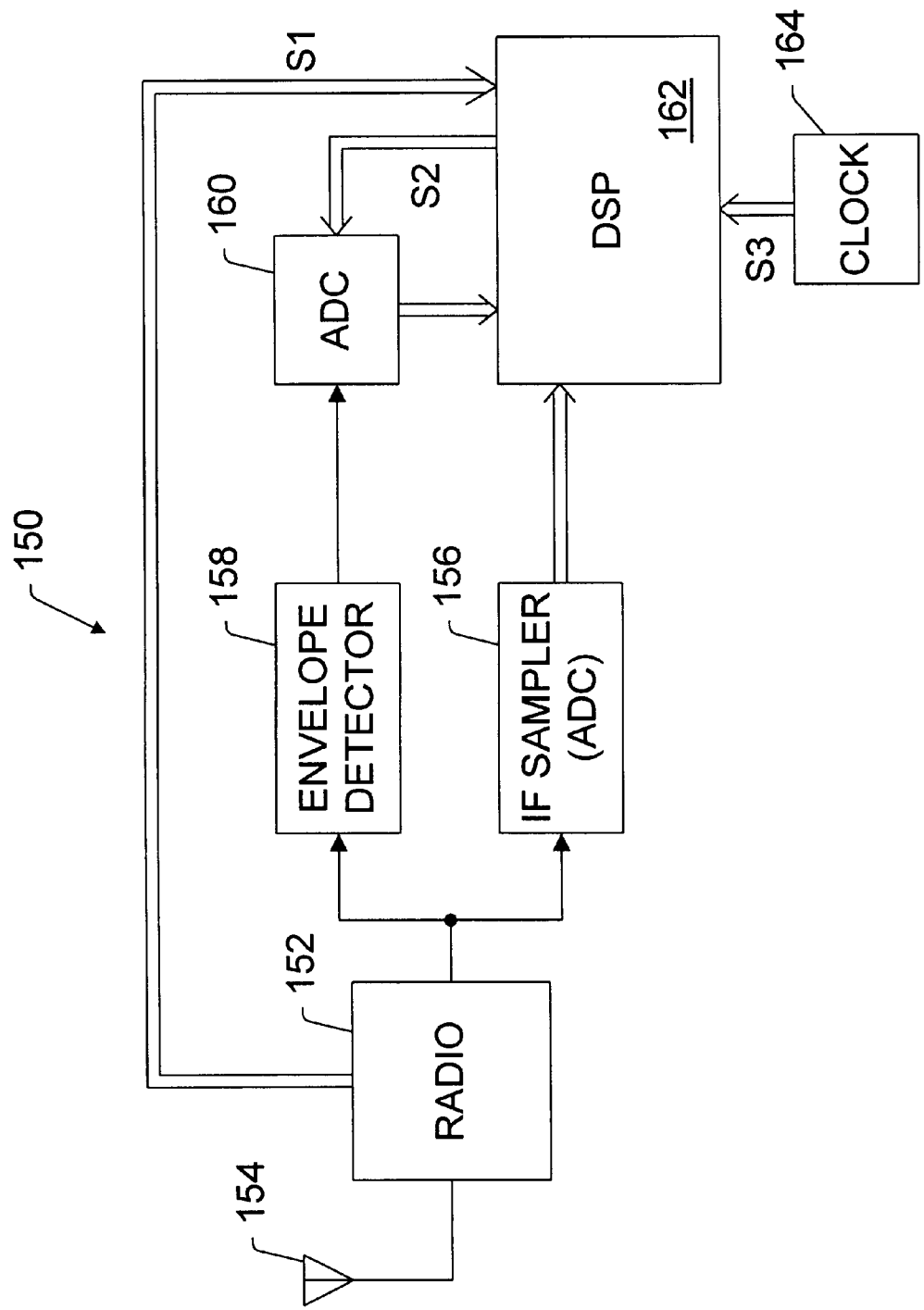
FIGS. 8A and 8B are functional block diagrams of receiving units capable of anticipating interference between transmitting units.
Figure 8B:
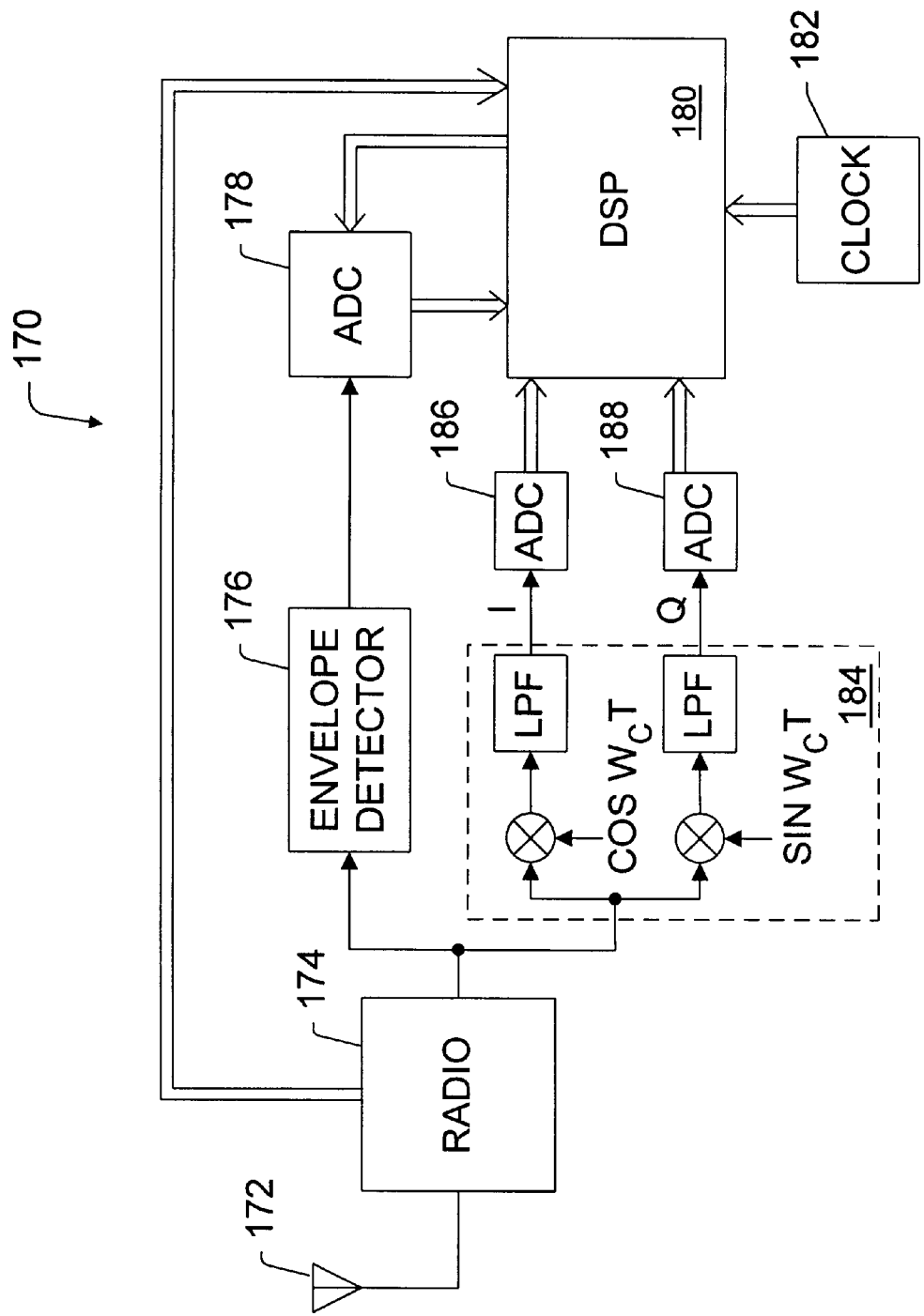

FIGS. 8A and 8B are functional block diagrams of receivers capable of avoiding interference. The receiver of FIG. 8A is an intermediate frequency (IF) sampling receiver 150. An incoming radio frequency (RF) signal is received by a radio 152 through an RF antenna 154 and down converted to IF. The radio 152 delivers the IF signal to an IF sampler 156 and to an envelope detector 158. An analog-to-digital converter (ADC) 160 samples the detected envelope. A digital signal processing (DSP) circuit 162 receives the sampled IF signal and the sampled envelope and determines the strength of the received signal. The radio provides an automatic gain control (AGC) signal S1 to the DSP circuit 162, which itself provides a sampling control signal S2 to the ADC 160. A clocking circuit 164 provides a timing signal S3 to the DSP circuit 162.

The receiver of FIG. 8B is a baseband demodulation receiver 170 with IF envelope detection. As with the receiver of FIG. 8A, the baseband receiver includes an RF antenna 172, a radio 174 that down converts the received RF signal to IF, an envelope detector 176, an analog-to-digital converter (ADC) 178, and a DSP circuit 180 controlled by timing signals from a clocking circuit 182. Instead of an IF circuit, however, the baseband receiver 170 includes baseband demodulation circuitry 184, which down-converts the received components. The receiver 170 also includes two additional analog-to-digital converters 186, 188, which sample the baseband signals I, Q for the DSP circuit 180. The envelope detection function may be carried out by the DSP circuit 180 instead of a separate envelope detector 176.

A number of embodiments of the present invention have been described. Nevertheless, it will be understood that various modifications may be made without departing from the spirit and scope of the invention. For example, while the invention has been described in terms of a slotted TDMA/TDD network, the invention may be implemented in networks using other communication technologies, including frequency division multiple access (FDMA) and frequency division duplex (FDD) systems, and CDMA/TDD systems. In a FDMA or FDD system, the invention may be implemented by replacing time-domain elements described above with frequency-domain elements, e.g., by using frequency guard bands instead of time guard bands. The invention also is not limited to use in fixed stations, but may be used in mobile units as well as virtually any other type of wireless receiver. Accordingly, other embodiments are within the scope of the following claims.

What is claimed is:

1. A method for use in allowing a wireless receiver to avoid interference from a potentially interfering transmitter, the method comprising:
   (a) determining whether a signal from the potentially interfering transmitter is operating at essentially the same carrier frequency as an expected signal at an assigned carrier frequency;
   (b) determining whether a predicted carrier to interference noise ratio of the receiver will exceed a predetermined level based on the greater of an instantaneous carrier signal strength and an average carrier signal strength; and
   (c) if so, causing the receiver to switch to another carrier frequency to receive the expected signal.

2. The method of claim 1, further comprising determining strength of the potentially interfering signal by measuring received signal strength just outside of a preassigned reception slot within which the receiver is to receive a portion of the expected signal.

3. The method of claim 2, further comprising determining strength of the expected signal by measuring received signal strength within the reception slot.

4. The method of claim 3, wherein determining whether interference is likely to occur comprises determining the difference between the signal strength measured just outside the reception slot and the signal strength measured within the reception slot.

5. The method of claim 3, further comprising using the signal strength measured within the reception slot to update a running average of signal strengths.

6. The method of claim 5, wherein determining whether interference is likely to occur comprises determining which of the following values is larger: the signal strength measured within the reception slot and the updated average of measured signal strengths.

7. The method of claim 6, wherein determining whether interference is likely to occur also includes determining the difference between the larger value and the signal strength measured just outside the reception slot.

8. The method of claim 2, wherein determining the strength of the potentially interfering signal includes measuring received signal strength just outside of another slot immediately adjacent to the reception slot if the adjacent slot is blind with respect to the reception slot.

9. A method for use in allowing a wireless receiver to avoid interference from a potentially interfering transmitter, the receiver having a control element that indicates boundaries of a predefined reception slot within which the receiver is to receive an expected signal operating at a first carrier frequency and that allows the reception slot to drift with respect to a similar slot defined by a controller in the potentially interfering transmitter, the method comprising:

(a) measuring received signal strength just outside of the reception slot to determine strength of the potentially interfering signal having essentially the same carrier frequency as the first carrier frequency, unless the measurement will be preceded or followed immediately by an adjacent slot that is blind with respect to the reception slot, (b) measuring received signal strength just outside the adjacent slot if the adjacent slot is a blind slot, (c) measuring received instantaneous signal strength during the reception slot to determine strength of the expected signal, (d) using the instantaneous signal strength measured during the reception slot to update a running average of signal strengths, (e) determining the larger of the following values:
the instantaneous signal strength measured during the reception slot and the updated running average, (f) determining the difference between the larger value and the signal measured just outside the reception slot or the adjacent blind slot, and (g) if the difference does not exceed a predetermined threshold value, causing the receiver to switch to another carrier frequency to receive the expected signal.

10. The method of claim 9, wherein the receiver employs TDMA.

11. The method of claim 9, wherein the reception slot is a time slot of given duration.

12. A wireless receiver comprising:

(a) interference-detecting circuitry configured to determine whether a signal from the potentially interfering transmitter is operating at essentially the same carrier frequency as an expected signal at an assigned carrier frequency;

(b) ratio prediction circuitry for predicting whether the carrier to interference noise ratio of the receiver will exceed a predetermined level using the greater of an instantaneous carrier signal strength and an average carrier signal strength; and (c) interference-avoiding circuitry configured to cause the receiver to switch to another carrier frequency to receive the expected signal if the ratio prediction circuitry predicts that interference is likely to occur.

13. The receiver of claim 12, wherein the interference-detecting circuitry is configured to determine strength of the potentially interfering signal by measuring received signal strength just outside of a preassigned reception slot within which the receiver is to receive a portion of the expected signal.

14. The receiver of claim 13, wherein the interference-detecting circuitry also is configured to measure received signal strength during the reception slot to determine strength of the expected signal.

15. The receiver of claim 14, wherein the interference-detecting circuitry also is configured to determine the difference between the signal strength measured just outside of the reception slot and the signal strength measured during the reception slot.

16. The receiver of claim 14, wherein the interference-detecting circuitry also is configured to use the signal strength measured within the reception slot to update a running average of signal strengths.

17. The receiver of claim 16, wherein the interference-detecting circuitry also is configured to determine which of the following values is larger: the signal strength measured within the reception slot and the updated average of measured signal strengths.

18. The receiver of claim 16, wherein the interference-detecting circuitry also is configured to determine the difference between the larger value and the signal strength measured just outside of the reception slot.

19. The receiver of claim 13, wherein the interference-detecting circuitry is configured to measure received signal strength just outside of another slot immediately adjacent to the reception slot if the adjacent slot is blind with respect to the reception slot.

* * * * *